(12) United States Patent
Rivas et al.

(10) Patent No.: US 7,460,056 B2
(45) Date of Patent: Dec. 2, 2008

(54) MULTI PURPOSE RADAR SURVEILLANCE SYSTEM

(75) Inventors: Conrado Rivas, Savedalen (SE); Patrik Rivas, Alingsas (SE); Anders Hook, Hindas (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 11/720,457

(22) PCT Filed: Nov. 30, 2004

(86) PCT No.: PCT/SE2004/001763

§ 371 (c)(1),
(2), (4) Date: May 30, 2007

(87) PCT Pub. No.: WO2006/059926

PCT Pub. Date: Jun. 8, 2006

(65) Prior Publication Data

US 2008/0122678 A1    May 29, 2008

(51) Int. Cl.
*G01S 13/00*     (2006.01)
(52) U.S. Cl. .............................. 342/90; 342/36; 342/59; 342/159
(58) Field of Classification Search .................. 342/27, 342/36, 59, 90, 159
See application file for complete search history.

(56) References Cited

U.S. PATENT DOCUMENTS

| | | | | |
|---|---|---|---|---|
| 3,721,978 A | * | 3/1973 | Doggett, Jr. ................. | 342/101 |
| 4,319,243 A | * | 3/1982 | Vachenauer et al. ........... | 342/37 |
| 5,264,855 A | * | 11/1993 | Lammers et al. ............. | 342/159 |
| 5,448,243 A | * | 9/1995 | Bethke et al. ................. | 342/59 |
| 5,959,589 A | | 9/1999 | Sadovnik | |
| 6,304,760 B1 | * | 10/2001 | Thomson et al. ............. | 455/503 |
| 7,196,657 B2 | * | 3/2007 | Walton ........................ | 342/195 |

OTHER PUBLICATIONS

Griffiths, H.D. : From a Different Perspective Principles, Practice and Potential Bistatic Radar in: 2003 Proceedings of the International Conference on Radar, Adelaide, SA Australia Sep. 3-5, 2003, pp. 1-7, ISBN: 0-7803-7870-9.

* cited by examiner

*Primary Examiner*—Thomas H. Tarcza
*Assistant Examiner*—Peter M Bythrow
(74) *Attorney, Agent, or Firm*—Roger S. Burleigh

(57) ABSTRACT

The invention discloses a radar system (100) for the detection of low RCS-objects (110, 140, 150, 160, 190) such as forest fires, said system comprising a first plurality of stations (120) for transmitting radar energy, said stations having mechanically fixed antennas (220), and a second plurality of receive stations (130) for receiving reflections of radar energy transmitted from the transmit stations, said stations having mechanically fixed antennas (220). The antennas (220) of said transmit and receive stations have a main beam (221) which is essentially parallel to the ground, and at least a sub-set of the receive stations is equipped with means for recording a first and a second received signal, and means for subtracting one of said signals from the other of said signals. Said transmit and receive stations are arranged to function within the frequency range of 10-100 MHz.

3 Claims, 3 Drawing Sheets

$T=T_1$  $T=T_2$ $x_1$ ↕ $\Delta t_1$  $x_{21}$ ↕ $\Delta t_2$
$x_2$  $x_{22}$ $x_3$  $x_{23}$ $x_4$  $x_{24}$ $x_5$  $x_{25}$ $x_6$  $x_{26}$ $x_7$  $x_{27}$ $x_8$  $x_{28}$ $x_9$  $x_{29}$ $x_{10}$  $x_{30}$ $x_{11}$  $x_{31}$

Fig 3

MULTI PURPOSE RADAR SURVEILLANCE SYSTEM

TECHNICAL FIELD

The present invention discloses a radar system for the detection of low Radar Cross Section-objects such as forest fires, the system comprising a first plurality of transmit stations for transmitting radar energy which have mechanically fixed antennas. The system also comprises a second plurality of receive stations for receiving reflections of radar energy transmitted from the transmit stations, said stations having mechanically fixed antennas. In the system of the invention, the antennas of said transmit and receive stations have a main beam which is essentially parallel to the ground.

BACKGROUND ART

Current methods for detecting forest fires are relatively expensive and complicated. A "manual" method of detecting forest fires is by means of overflights of small aircraft, which is expensive. A known automated system for detecting forest fires is disclosed in U.S. Pat. No. 5,959,589. Some drawbacks which this system seems to suffer from are that the system is relatively complicated in that it involves moving parts and sensors of different kinds.

DISCLOSURE OF THE INVENTION

There is thus a need for an automated fire detection system which is less expensive and more efficient than those currently known. One way of keeping costs down would be to provide a system which can be used for a plurality of purposes, i.e. not only for the detection of fires, but also for detection of other objects with low observability which other users than fire protection agencies would desire to detect. In such a system, costs could be shared between the various users of the system.

Examples of such users could be military users wishing to detect low-observability objects such as stealth aircraft, or other civilian users such as rescue services who might wish to detect, for example, avalanche victims or people who have gone missing in remote areas.

Such a system is provided by the present invention in that it provides a radar system for the detection of low RCS-objects (Radar Cross Section) such as forest fires, the system comprising a first plurality of transmit stations for transmitting radar energy, said stations having mechanically fixed antennas, and a second plurality of receive stations for receiving reflections of radar energy transmitted from the transmit stations, said stations having mechanically fixed antennas.

The antennas of the transmit and receive stations have a main beam which is essentially parallel to the ground, and at least a sub-set of the receive stations is equipped with processing means for recording a first and a second received signal, and processing means for subtracting one of said signals from the other of said signals. Also, the transmit and receive stations are arranged to function within the frequency range of 10-800 MHz, preferably within the frequency range of 10-100 MHz.

It should be pointed out the at that one or both of the processing means mentioned above can be co-located with the receive stations, or located at a site remote from the stations.

By means of the system of the invention, detection of low observability targets becomes possible by means of a plurality of individual stations which are simple and thus inexpensive, which require low maintenance and are inexpensive to deploy.

BRIEF DESCRIPTION OF THE DRAWINGS

The invention will be described in more detail in the following description, with reference to the appended drawings, in which FIG. 3 shows a series of signals recorded by a system of the present invention.

EMBODIMENTS

Figure 1:
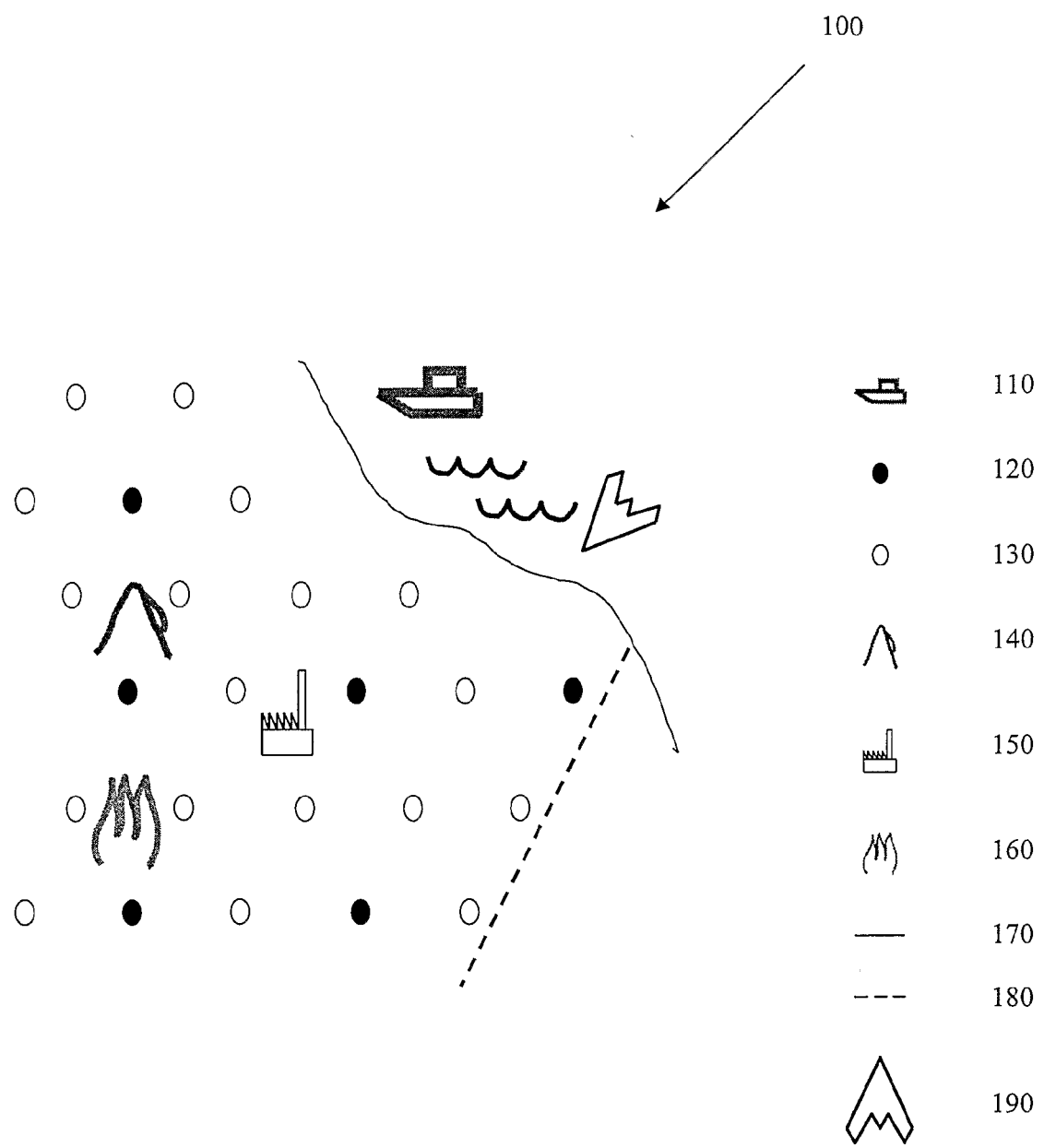
FIG. 1 shows an overview of a system according to the invention.

In FIG. 1, a system 100 of the present invention is schematically shown. The drawing comprises objects to be detected by the system, such as a surface craft 110, an avalanche 140, a sensitive object 150, such as, for example, a power plant, a forest fire 160, and an aircraft 170, in this example an aircraft with low Radar Cross Section (RCS). Since the system of the invention has the ability to detect objects with low RCS, the system also inherently has the ability to detect objects with larger RCS.

Also shown in the drawing are examples of system components, with reference numbers as follows: transmit stations 120 and receive stations 130, said stations being intended for transmitting and receiving, respectively, electromagnetic energy.

The continuous line shown in FIG. 1 depicts a coastal line, and the dotted line in FIG. 1 shows a border between two areas, countries etc.

Thus, FIG. 1 shows an example of low RCS-objects which it might be desired to detect, such as "stealth" aircraft 170, forest fires 160, avalanches 140 (in order to be able to be able to warn or to launch rescue efforts for victims.) etcetera. Examples of other objects which it might be desired to locate using the present invention are persons who have lost their way in remote areas, or the victims of the mentioned avalanches. The system of the invention could also be used as a surveillance system for sensitive installations such as the power plant 150.

In order to cover a large area, the system of the invention needs to propagate electromagnetic energy over such a large area. Needless to say, this should be done in a manner which is as easy and inexpensive as possible. FIG. 1 shows how this is accomplished by means of the invention: in the area which it is desired to cover with the system, there is deployed a plurality of transmit stations 120 for transmitting electromagnetic energy, radar energy.

As can be seen in FIG. 1, the system also comprises a plurality of receive stations 130, which are not necessarily co-located with the transmit stations 120. In addition, there is no need for the amount of transmit stations to be the same as the amount of receive stations. Preferably, the number of transmit stations 120 is greater than that of the receive stations 130.

The receive stations 130 are intended to receive energy which has been transmitted from the transmit stations 120 and which has then been reflected form objects in the area which is covered by the system 100. Energy which has been received in the receive stations 130 directly from the transmit stations, without any intermediate reflections, may be used as reference signals in subsequent signal processing.

Since the system 100 comprises what could be a rather large number of transmit and receive stations, it is important to keep the cost of these stations down. According to the invention, one way of doing this is to equip the transmit and receive stations with simple mechanically fixed antennas, in contrast to most known radar stations which utilize moving antennas on turntables.

One, several, or all of the transmit stations may be used to transmit simultaneously. Similarly, a more or less arbitrary number of the transmit stations may be used at any one time. One method which may be used for transmitting is the previously known method of "Time Division Multiplex", i.e. each station is allotted a time slot in which it may transmit, the stations transmitting on one and the same frequency or on a number of different frequencies.

Another transmission method which may be mentioned are "Code Division Multiplex", i.e. a number of different stations transmit at the same time and on the same frequency, but with coded signals which allow the receive stations to differentiate between the received signals.

Yet another method for achieving resolution between the signals transmitted by the various transmit stations is Frequency Division Multiplex, i.e. each transmit station is assigned its own transmit frequency. All of these methods can be employed alone, or in combination with any of the other methods.

Figure 2:
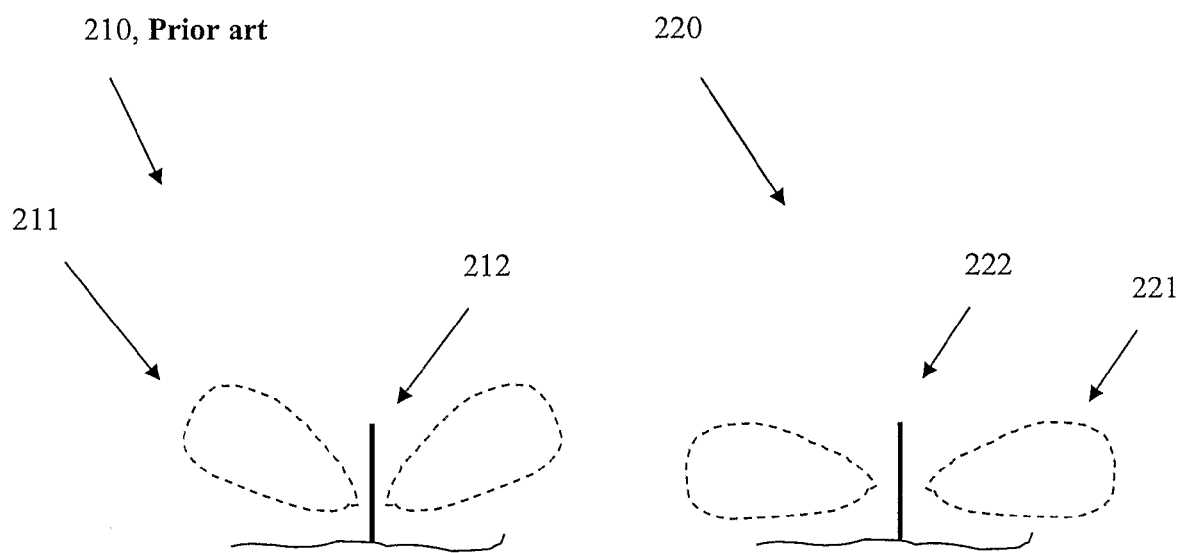
FIG. 2 shows an antenna for use in a system of the invention.

FIG. 2 shows an example of an antenna 210 of a previously used kind. As shown in the drawing, the known antenna has elevated beams 211 with respect to the ground level. This is due to the fact that elevated beams suppress ground reflections to a higher extent than reflections from, for example, aircraft.

FIG. 2 also shows examples of embodiments of the antennas of the transmit 120 and receive 130 stations of the system 100 of the invention: as stated previously, the antennas both of the transmit and receive stations are suitably but not necessarily of the stationary kind. The antennas can be dipole antennas or monopole antennas. Also, array antennas are conceivable within the scope of the invention. One possible advantage of an array antenna could be that it transmits/receives in azimuth sectors, which could facilitate any subsequent signal processing.

FIG. 2 shows the antenna beams 221 of the transmit and receive station antennas 220 of the invention. As shown, these beams 211 are not elevated, rather they are terrain-illuminating. A definition of a ground-illuminating beam could be that a line from the phase centre of the antenna through the maximum of the main beam of the antenna is basically parallel to the ground plane in the vicinity of the antenna.

A beneficial side-effect of this feature of the antennas of the transmit and send stations of the system of the invention is that antennas with terrain-illuminating beams are considerably easier and less expensive to manufacture than antennas with elevated beams. Thus, the cost of the system is reduced by the proposed antennas 220.

However, as an alternative, antennas which employ so called "beam tilting" should not be excluded. This can be carried out either electrically or even mechanically.

Another beneficial aspect of the antennas 220 of the system is that they can be realized as simple dipole antennas, with a feed connection at one end of the antenna.

Although the beams 221 of the antennas 220 are basically ground-illuminating, it should be noted that most aircraft will still be illuminated by these antennas, and will thus be detectable by the system 100.

However, an obvious implication of the use of ground-illuminating antennas is that returns will be received not only from those objects which it is desired to protect, but also from a wide variety of objects in the terrain surrounding the send and/or transmit stations of the system 100. Thus, a solution must be found to cope with the unwanted returns.

Until now, the description has mainly focused on the antennas 220 of the transmit 120 and receive 130 stations of the system. However, the system 100 of the invention also comprises means in or connected to the transmit and (mainly) receive stations for processing the returns received in a desirable manner.

Said processing means can either be located at a number of receive stations, or as an alternative, the receive stations can merely forward the signals that are received to a central processing station that is connected to the receive stations. There can also be variations or combinations of this, i.e. some or all of the receive stations can comprise some of the processing means, and a central processing station will then receive data that is "semi-processed". All of these combinations are within the scope of the invention.

The processing means of the invention work according to the following principle: the radar returns from the terrain when no targets are present, or when targets are present and known by other means, are recorded in the processing means as a "background definition". At a later point in time, when it is desired to detect targets, this "background definition" is used to subtract from the radar returns received at that point in time. In this way, terrain echoes will be suppressed, and radar "echoes" from low-observability objects will emerge clearly.

As a variation on the method of background subtraction, less stable background echoes can also be eliminated, by means of the following: the processing means in the receive station/s can be equipped to record a series of background responses. Response by response may then be subtracted from each other in such a way that various well known integration techniques can be applied to the remaining array of differences in order to suppress the background echoes which it is desired to block out.

A schematic way of background subtraction is shown in FIG. 3: beginning at a first point in time, $T_1$, a number of radar returns $x_1$-$x_{11}$ are received, spaced apart in time by an interval $\Delta t_1$. At $T_1$, and for the duration of the time during which the returns are received, it is known that there are no forest fires etc in the area which is covered by the system 100.

At a later point in time $T_2$, when it is desired to detect the objects described above, i.e. forest fires etc, a second series of radar returns $x_{21}$-$x_{31}$ is recorded, the returns in the second series being spaced apart in time by an interval $\Delta t_2$, the time intervals $\Delta t_1$ and $\Delta t_2$ not necessarily being the same.

Then, the returns in the first series are subtracted from the returns in the second series in the following manner: $x_{21}$-$x_1$, $x_{22}$-$x_2$ ... $X_{31}$-$x_{11}$, with possible differences in the returns being indicative of the presence of an object which it is desired to detect. A threshold can be set so that the presence of an object will be indicated if the amplitude of such a difference exceeds the threshold.

Other methods of signal processing apart from those mentioned above may also be employed in the processing means of the invention. Such signal processing methods may include one or more of such techniques as Doppler processing, time-variable attenuators, receivers with a large dynamic range or adaptive filters.

The invention claimed is:

1. A radar system for the detection of low RCS-objects such as forest fires, said system comprising:
   a first plurality of stations for transmitting radar energy, said stations having mechanically fixed antennas, a second plurality of receive stations for receiving reflections of radar energy transmitted from the transmit stations, said stations having mechanically fixed antennas, the antennas of said transmit and receive stations having a main beam which is essentially parallel to the ground, in which system at least a sub-set of the receive stations is equipped with processing means for recording a first and a second received signal, and processing means for subtracting one of said signals from the other of said signals, and said transmit and receive stations are arranged to function within the frequency range 10-800 MHz, the system being characterized in that the antennas of the transmit and receive stations are one of the following kinds of antennas:

dipole antennas with a centre feed monopole antennas with a feed from one end, and in that said sub-set of receive stations is equipped with processing means for recording a plurality of received signal, and with processing means for extracting the difference between one signal and a previous one of said signals and also with means for integrating said differences.

2. A radar system for the detection of low RCS-objects such as forest fires, said system comprising:

a first plurality of stations for transmitting radar energy, said stations having mechanically fixed antennas, a second plurality of received stations for receiving reflections of radar energy transmitted from the transmit stations having mechanically fixed antennas, the antennas of said transmit and received stations having a main beam which is essentially parallel to the ground, In which means for recording a first and a second received signal, and processing means for subtracting one of said signals from the other of said signals, and said transmit and received stations are arranged to function within the frequency range of 10-800 MHz, the system being characterized in that at least one of the antennas is an array antenna, and in that said sub-set of receive stations is equipped with processing means for recording a plurality of received signals, and with processing means for extracting the difference between one signal and a previous one of said signals, and also with means for integrating said differences.

3. The radar system of claim 1, in which said transmit and receive stations are arranged to function within the frequency range of 10-100 MHz.

* * * * *

UNITED STATES PATENT AND TRADEMARK OFFICE
CERTIFICATE OF CORRECTION

PATENT NO. : 7,460,056 B2  Page 1 of 1
APPLICATION NO. : 11/720457
DATED : December 2, 2008
INVENTOR(S) : Rivas et al.

It is certified that error appears in the above-identified patent and that said Letters Patent is hereby corrected as shown below:

On the title page, item (73), under "Assignee", in Column 1, Line 1, delete "L M Ericsso" and insert -- LM Ericsson --, therefor.

Signed and Sealed this

Twenty-first Day of April, 2009

JOHN DOLL
*Acting Director of the United States Patent and Trademark Office*